(12) United States Patent
McIntyre et al.

(10) Patent No.: US 6,996,223 B2
(45) Date of Patent: Feb. 7, 2006

(54) METHOD, APPARATUS AND COMPUTER PROGRAM PRODUCT FOR INTERACTIVE PHONE CALL ROUTING IN A SERVICE PROVIDER NETWORK AND INFORMATION PROCESSING IN AN ENTERPRISE NETWORK

(75) Inventors: Joseph Herbert McIntyre, Austin, TX (US); Martin F. Slatnick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/626,195

(22) Filed: Jul. 24, 2003

(65) Prior Publication Data

US 2005/0018831 A1   Jan. 27, 2005

(51) Int. Cl.
H04M 3/523    (2006.01)
H04M 7/00    (2006.01)
(52) U.S. Cl. ............. 379/220.01; 379/231; 379/265.02
(58) Field of Classification Search ................ 379/219, 379/220.01, 231, 232, 265.01, 265.02
See application file for complete search history.

(56) References Cited

U.S. PATENT DOCUMENTS

| | | | |
|---|---|---|---|
| 5,452,350 A * | 9/1995 | Reynolds et al. | 379/221.07 |
| 5,905,792 A * | 5/1999 | Miloslavsky | 379/265.11 |
| 5,923,745 A * | 7/1999 | Hurd | 379/265.02 |
| 5,926,535 A * | 7/1999 | Reynolds | 379/221.06 |
| 6,408,063 B1 | 6/2002 | Slotte et al. | 379/230 |
| 6,418,210 B1 | 7/2002 | Sayko | 379/142.15 |
| 6,801,613 B1 * | 10/2004 | Hamilton | 379/207.02 |
| 6,834,101 B1 * | 12/2004 | Pershan | 379/207.04 |
| 2002/0146104 A1 | 10/2002 | McIntyre | 379/211.02 |
| 2002/0146105 A1 | 10/2002 | McIntyre | 379/211.02 |
| 2002/0181683 A1 | 12/2002 | Mani | 379/201.01 |
| 2002/0191595 A1 | 12/2002 | Mar et al. | 370/352 |
| 2003/0021290 A1 | 1/2003 | Jones | 370/466 |
| 2003/0021403 A1 | 1/2003 | Jones | 379/210.02 |

* cited by examiner

Primary Examiner—Harry S. Hong
(74) Attorney, Agent, or Firm—Anthony V. S. England; Diana L. Roberts-Gerhardt

(57) ABSTRACT

A phone call is routed in a telephone service provider network in interaction with information processing in an enterprise network includes receiving a call by a telephone service provider network ("TSPN") from a caller. The call is directed to a callee associated with an enterprise and processed by the TSPN. A call notification is sent to a telecommunication application server ("TAS") of the enterprise that is not within the TSPN. The call notification is sent and the TSPN's processing of the call is delayed before the call is completed in order to permit an enterprise application of the TAS to begin processing for the call. The processing of the call is resumed responsive to notification from the TAS. The call notification may include first information for which the enterprise application finds associated second information, so that the callee receives the second information more nearly in concurrence with receiving the call.

33 Claims, 4 Drawing Sheets

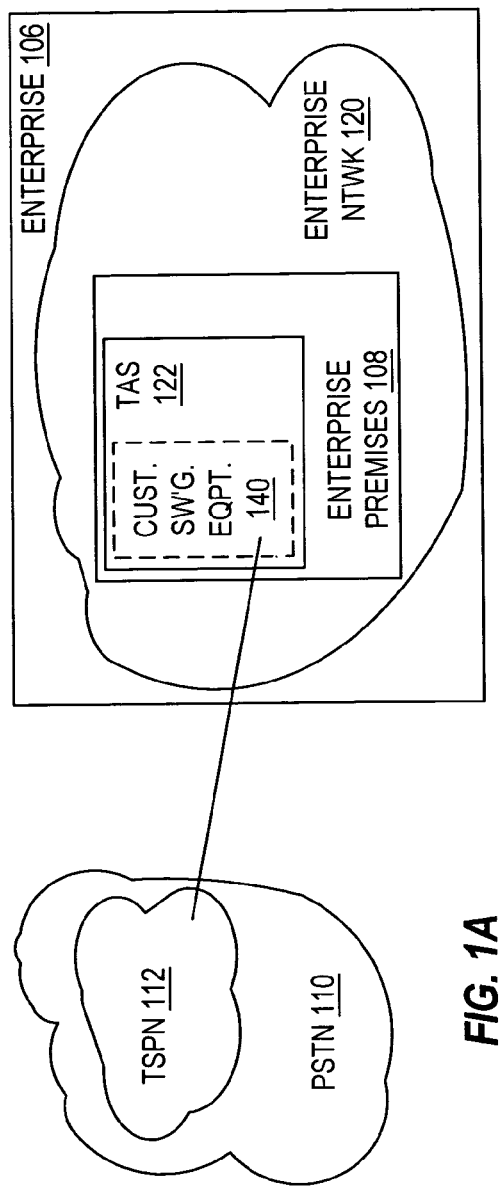
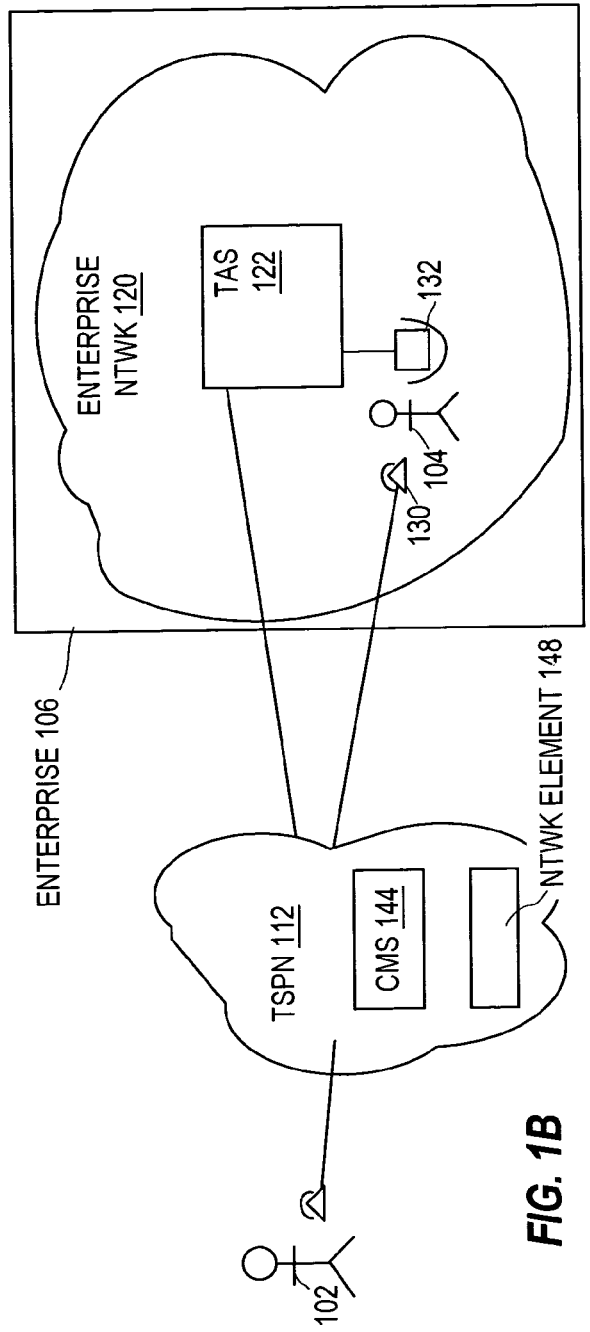
FIG. 1A
FIG. 1B

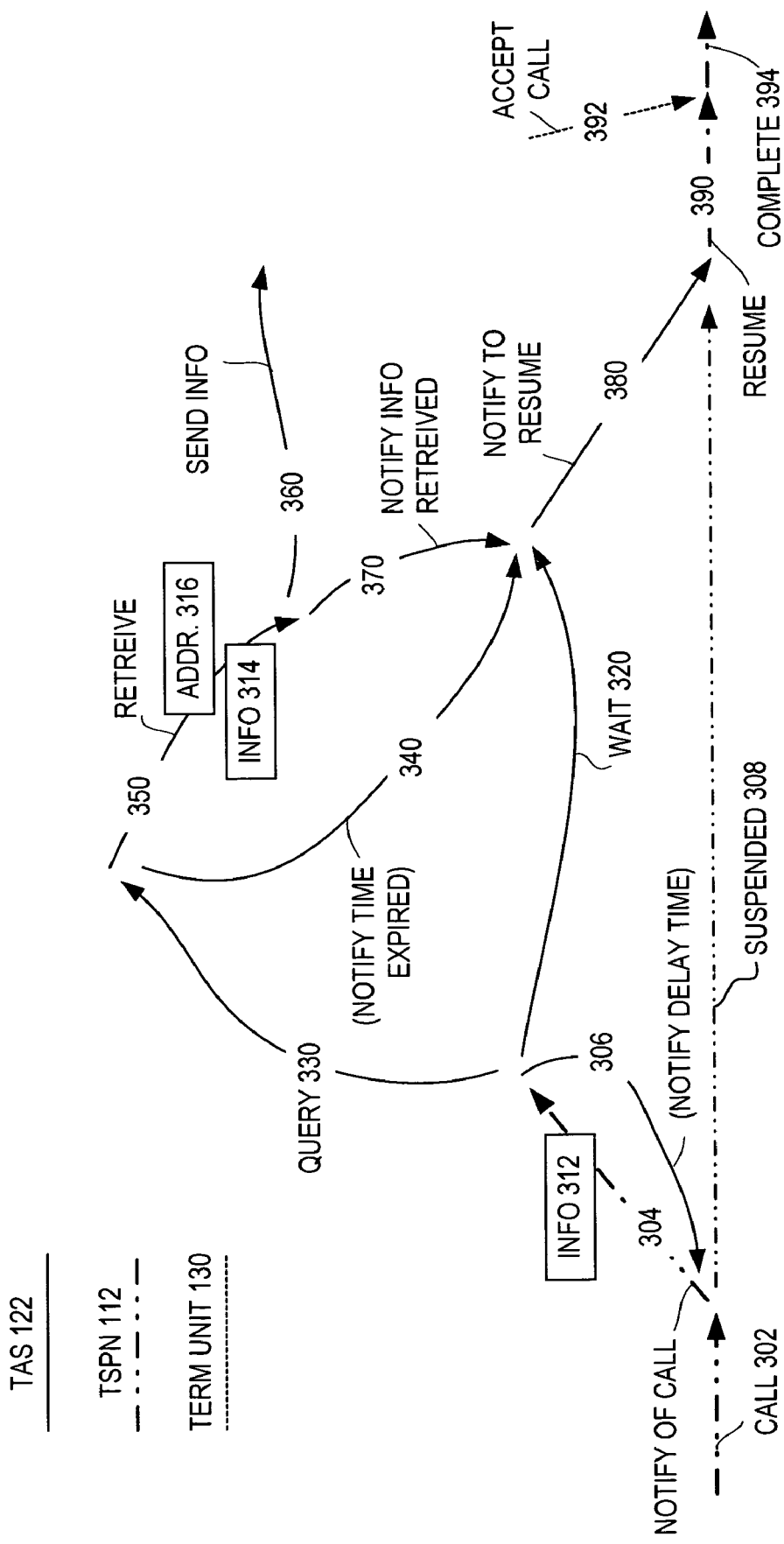

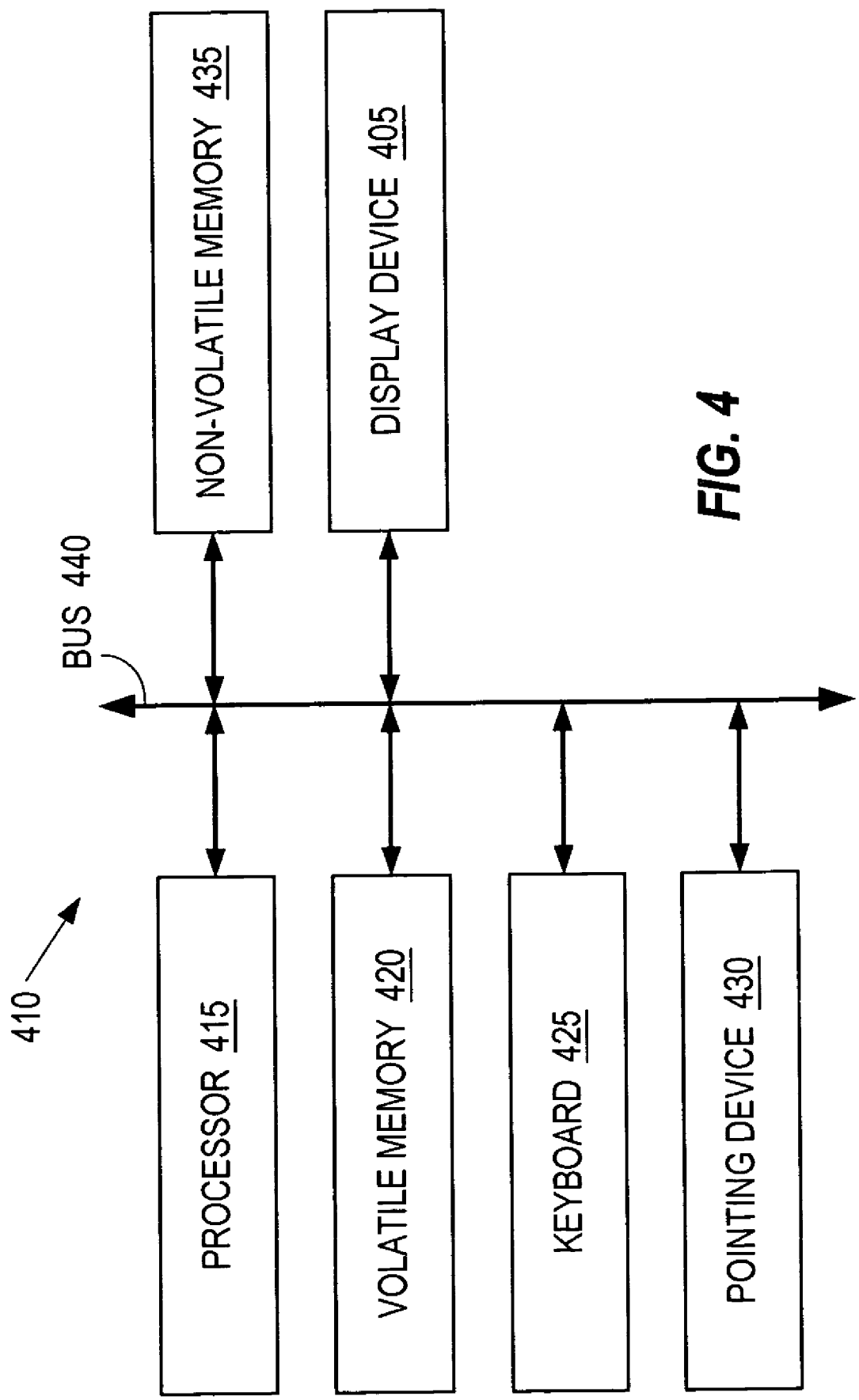

METHOD, APPARATUS AND COMPUTER PROGRAM PRODUCT FOR INTERACTIVE PHONE CALL ROUTING IN A SERVICE PROVIDER NETWORK AND INFORMATION PROCESSING IN AN ENTERPRISE NETWORK

BACKGROUND

1. Field of the Invention

The present invention relates to calls over a switched telephone network, and, more particularly, to interaction between the switched telephone network and a telecommunication application server of an enterprise to which the call is directed.

2. Related Art

Herein, reference is made to "telecommunications equipment" or "telecommunications switching equipment." It should be understood that this term is intended to include equipment in the nature of Internet protocol network equipment. Reference is also made herein to a "telecommunications service provider," or simply a "service provider." It should be understood that either term is intended to refer to a provider of telecommunications or Internet service.

In a conventional arrangement, a business enterprise is a customer of a service provider and the enterprise has telecommunications switching equipment such as a private branch exchange ("PBX") on its premises and this customer premise switching equipment is connected to the service provider's switching equipment, typically located in a central office remote from the customer's premises. In some circumstances this PBX equipment, though dedicated to the business enterprise, is nevertheless located in the central office, or at least somewhere other than the customer premises. It should be understood that herein the term "customer switching equipment" is used to refer to telecommunications switching equipment dedicated to an enterprise regardless of whether the equipment is located on the customer premises or not and regardless of whether the equipment is a PBX by all definitions. The service provider switching equipment, i.e., telecommunications service provider network ("TSPN"), is part of the public switched telephone network ("PSTN").

According to this conventional arrangement, a call coming into the enterprise is "completed" from the standpoint of the central office equipment, i.e., with respect to the TSPN, as soon as the call is handed off to the customer switching equipment even though the call has not yet been routed all the way through the customer switching equipment and to a desk set or the like ("terminal equipment") of a callee in the enterprise. Terminal equipment includes, but is not limited to, black phones, mobile phones, IP phone and soft phones.

A "call center" is another well-known arrangement in which the customer equipment, typically in connection with an enterprise network (which may include a server, or a network of servers or of servers and clients) manages incoming calls in a variety of aspects. For example, it is well known for an incoming call to complete at the call center and then for the call center's server to serve up information for display on a client computer system that is sitting in front of a service representative. This may even be done in a fashion according to which the information is displayed on the client system at about the same time that the call center customer switching equipment delivers the incoming call to the service representative's terminal equipment.

It should be appreciated that while the functionality provided by a call center is desirable, nevertheless its complexity and its specialized equipment are not desirable. Therefore a need exists for improvements in the apparatus and processes by which telecommunications calls are handled, and particularly in the interaction between a TSPN and enterprise network.

SUMMARY OF THE INVENTION

The foregoing need is addressed in the present invention. According to one form of the invention, a call is placed within a PSTN from a caller. The call is directed to a callee associated with an enterprise. The call is routed via a TSPN, i.e., part of the PSTN, to the enterprise. The TSPN completes the call when a unit of terminal equipment for the enterprise accepts the call. However, before the call is completed a telecommunication application server ("TAS") of the enterprise, which is not within the PSTN, is notified of the call. The notification includes first information regarding the caller, such as a telephone number from which the call has originated. Responsive to receiving the notification, and before completion of the call, the server initiates an enterprise application. Meanwhile, the TSPN delays processing of the call, also before call completion. The TSPN resumes the call processing responsive to a resume notification from the TAS.

In one alternative, the task performed by the enterprise application includes searching for second information associated with the first information. This is advantageous because the server can forward the second information for delivery to the callee more nearly in concurrence with the call completion, since the server is provided the first information prior to the call completion. Consequently, the second information may be delivered to the callee at the same time as, or even prior to, the call completion.

The more direct cooperation between the TSPN and the enterprise network according to the above described arrangement is advantageous in that it reduces complexity arising with specialized call centers and increases flexibility in the implementation of enterprise processing in connection with call handling.

Additional objects, advantages, aspects and other forms of the invention will become apparent upon reading the following detailed description and upon reference to the accompanying drawings.

BRIEF DESCRIPTION OF THE FIGURES

FIG. 1A illustrates a public switched telephone network connected to an enterprise, according to an embodiment of the present invention.

FIG. 1B illustrates additional aspects of the public switched telephone network connected to the enterprise, according to an embodiment of the present invention.

FIG. 3 illustrates aspects of information flow, processing steps and timing, according to an embodiment of the present invention.

FIG. 4 illustrates a computer system that is applicable to various aspects of the present invention, in its various embodiments.

DETAILED DESCRIPTION OF A PREFERRED EMBODIMENT

Figure 2:
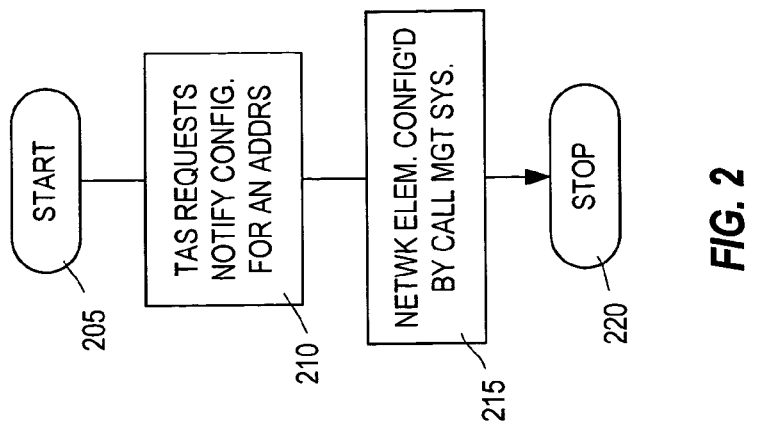
FIG. 2 illustrates processing steps that concern configuring an address to generate a notification, according to an embodiment of the present invention.

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Referring now to FIG. 1A, according to an embodiment of the present invention, a PSTN 110 has a TSPN 112. The TSPN 112 is connected to an enterprise 106 having an enterprise network 120, which in turn includes a TAS 122 on the enterprise premises 108 and, optionally, customer switching equipment 140.

Referring now to FIG. 1B, a call is placed within a TSPN 112 from a caller 102. The call is directed to a callee 104 associated with enterprise 106. The call is routed in the public switched telephone network (not shown in FIG. 1B) via the TSPN 112 to the enterprise network 120.

According to one embodiment of the present invention, the enterprise 106 has no customer switching equipment dedicated solely to the enterprise 106, neither on its premises 108 (FIG. 1) nor anywhere else. Consequently, the TSPN 112 completes incoming calls to the enterprise 106 when a unit of the enterprise's terminal equipment 130 accepts the call, i.e., "picks up" responsive to the call. That is, calls are not completed by the TSPN 112 unless and until the enterprise's terminal equipment 130 accepts the call.

The unit of the enterprise's terminal equipment 130 is associated with an employee 104 of the enterprise 106, who is also served by a device 132 such as a computer system with a display or speaker on which the employee 104 can view or hear information provided to him or her by the TAS 122. Alternatively, the device 132 may be a display or speaker of the terminal equipment 130, which may itself be a computer system. For example, the terminal equipment 130 may be a cellular telephone which includes a computer device 132 for receiving information and displaying it on a display of the telephone. (Additional details of FIG. 1B will be described herein below.)

Figure 1C:
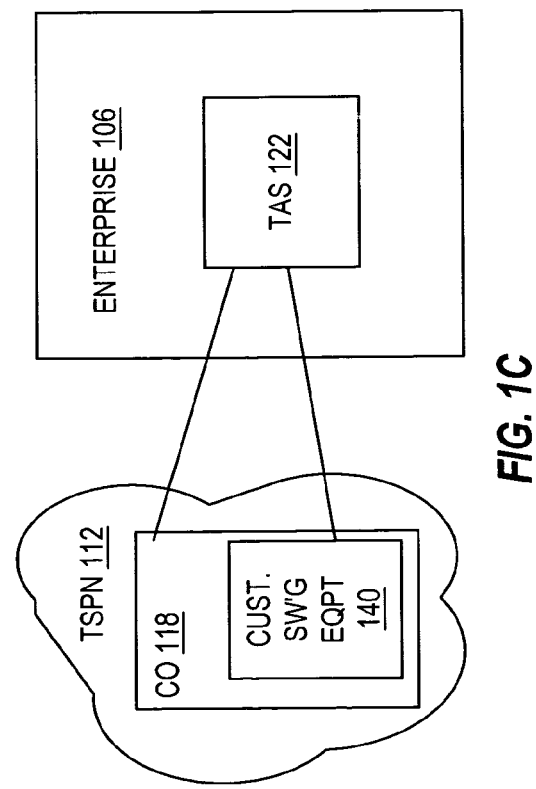
FIG. 1C illustrates one alternative regarding customer switching equipment in the arrangement of FIGS. 1A and 1B, according to an embodiment of the present invention.

Referring now to FIG. 1C, one embodiment of the invention is depicted in which the enterprise 106 has customer switching equipment 140 dedicated solely to the enterprise 106 at a central office ("CO") 118 of the TSPN 112.

Figure 1D:
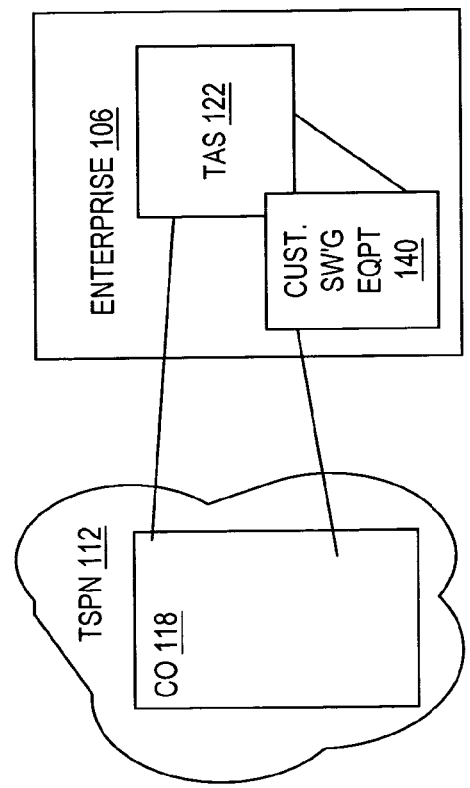
FIG. 1D illustrates another alternative regarding customer switching equipment in the arrangement of FIGS. 1A and 1B, according to an embodiment of the present invention.

Referring now to FIG. 1D, another embodiment of the invention is depicted in which the enterprise 106 has customer switching equipment 140 dedicated solely to the enterprise 106 on its own premises. As was previously illustrated in FIG. 1B, the enterprise 106 has no customer switching equipment in one embodiment of the invention.

According to the present invention, even if the enterprise 106 has customer switching equipment 140 as in FIGS. 1C and 1D, the function of customer switching equipment 140 is limited to completing the connection to the terminal equipment 130 after the TAS 122 has handled the call processing, or at least begun handling the call processing. For example, in one embodiment PBX customer switching equipment 140 located at the customer's premises 108 receives a call for delivery to a desk set. However, the switching equipment 140 does not receive the call at the customer's premises 108 until processing by the TAS 122 has begun.

Referring now to FIG. 2, processing steps are illustrated that concern configuring an address to generate a notification, according to an embodiment of the present invention. (In the following description reference is also made to elements numbered "1xx" of FIG. 1B.) After beginning at 205, the TAS 122 of the enterprise network 120 (which is not within the PSTN 110) sends a message at 210 to a call management system ("CMS") 144 of the TSPN 112 requesting the CMS 144 to configure a network element 148 within the TSPN 112 to operate in a certain manner. Responsive to the request at 210, the CMS 144 accordingly configures the network element 148 at 215 such that the network element 148 generates a notification to the enterprise network 120 in response to handling a call to the network 120 and suspends processing of the call until told by the network 120 to continue the call processing. Next, the process completes at 220, having configured the network element 148.

Referring now to FIG. 3, aspects of information flow, processing steps and timing are illustrated, according to an embodiment of the present invention. (In the following description reference is also to made elements numbered "1xx" of FIGS. 1A through 1D.) To begin, the TAS 122 of the enterprise network 120 is notified 304 of an incoming call 302 from the TSPN 112. The notification includes first information 312 regarding the caller 102, such as a telephone number from which the call 302 has originated, and the callee 104, such as a telephone number to which the call is to be terminated. While telephone numbers are used to provide an easily understandable scenario, other forms of caller and callee identification are possible. Also, the information provided is not limited to just this information, though this example only requires these.

In one alternative the TAS 122 notifies 306 the TSPN 112 to delay continuing the call for a specific time interval, responsive to receiving the notification 304, and before completion of the call, indicating for the TSPN 112 to suspend 308 processing of the call, so that an enterprise application of the TAS 122 can begin processing for the call 302. In another alternative, the TSPN 112 automatically suspends 308 processing of the call after sending the notification 304. (In this context, it should be understood that "suspending processing of the call" does not necessarily mean that the TSPN 112 suspends 100% of all processing for the call. It may also mean merely that the TSPN 112 delays completion of the call during the suspended interval.) In any event, responsive to receiving the notification 304, and before completion of the call, the TAS 122 initiates an enterprise application, which in the example shown forms a query 330 for second information 314. The second information 314 is associated with the first information 312. That is, the kind of processing that the telecommunication application TAS 122 executes concurrently with connecting the incoming phone call 302 may include gathering information 314 about the customer who is calling, information about a recent transaction that the customer had with the callee, such as a purchase, etc.

In this illustrative embodiment shown in FIG. 3, where the enterprise application initiates the query 330, the TAS 122 retrieves 350 the information 314 and then sends 360 the information 314 to device 132 of the employee of the enterprise to which the call 302 is directed. (This, of course, also requires that the TAS 122 retrieves information 316 from which the TAS 122 can determine an address for the device 132, as well. That is, the TAS 122 sends the information 314 about the caller or the call 302 to the employee's device 132 via an address that the TAS 122 determines responsive to information 310 received with the call 302.) Also responsive to receiving the notification 304 of the call 302, the server initiates a process that waits 320 for notification that the application processing, such as the retrieval of second information 314 has been completed before instructing the TSPN 112 to resume. Besides sending 360 the information 314 to the device 132, the TAS 122 also notifies 370 the wait process 320 that the information 314 has been retrieved. (As also indicated in FIG. 3, as an alternative to notifying 370 the wait process 320 that the information 314 has been retrieved the TAS 122 may send a notice 340 to the process 320 of expiration of a certain elapsed time. In a still further alternative, the TAS 122 may merely send the wait process 320 a value indicating a certain time to wait and the process 320 may itself determine when the time is elapsed.)

Upon expiration of the wait 320, by whatever means, the TAS 122 notifies 380 the TSPN 112 to resume processing for the call 302. Responsively, the TSPN 112 proceeds 390 to complete 394 the call 302 responsive to a signal 392 from the terminal equipment 130 of the callee indicating that the call has been accepted, e.g., a telephone goes off-hook. Since the TAS 122 is provided the first information 310 prior to the call 302 completion, the TAS 122 performs enterprise application processing and can forward the second information 314 for delivery to the device 132 of callee more nearly in concurrence with the call completion. Consequently, the second information 312 may be delivered to the callee at the same time as, or even prior to, the call completion.

Moreover, in certain respects there are even advantages to intentionally delaying completion of the call. For example, from the standpoint of the callee 104, it may be advantageous to delay completion to give the TAS 122 time to find and forward the information about the call 302 so that callee 104 receives the telephone call 302 from the TSPN 112 at about the same time as receiving the information 314 fetched by the TAS 122. From the standpoint of the perception of the caller 102, it is generally acceptable, and may even be desirable, to introduce this delay. That is, the delay that is introduced by this invention is short enough to usually avoid creating the impression in a caller than the call has failed to go through, so the delay causes the caller no concern from that standpoint. Furthermore, callers generally attribute some call completion waiting time to delay on the part of the callee's resources. But callers may tend to wait until ringing begins before they start counting call waiting time against the callee. So the delay in ringing that is introduced by the invention may actually cause the caller 102 to perceive that the callee 104 has responded more promptly to the ringing telephone.

According to one embodiment of the invention, the TAS 122 may wait for a certain interval before notifying 380 the TSPN 112 to resume processing the call 302 in an effort to optimize the delay for the above mentioned advantage. In one embodiment of the invention, the interval is determined by the TAS 122 responsive to its own estimate of delay that it will encounter in delivering its information to the callee.

In one alternative, the delay notification 306, for indicating for the TSPN 112 to suspend processing of the call 302, serves to also provide the function of the resume notification 380 by specifying a certain time to the TSPN 112, so that the TSPN may resume 390 processing of the call 302 after a delay responsive to the certain time specified.

Thus, the TSPN 112 automatically suspends 308 processing of the call 302 upon sending the notification 304 to the TAS 122 in one alternative, and suspends 308 responsive to a suspend notification 306 from the TAS 122 in another. Regardless of which alternative is implemented with regard to suspension, there are at least two alternative embodiments for resumption of call processing. In one alternative, the TSPN 112 resumes 390 processing of the call 302 immediately upon receiving a resume notification 380. In another alternative, the TSPN 112 resumes 390 responsive to a time indicated in the resume notification 380.

As previously mentioned, in an embodiment of the invention the terminal equipment 130 on which the callee receives incoming calls includes a computer system. Referring to FIG. 4, a block diagram illustrating a computer system 410 is shown, according to an embodiment of the present invention. Variations of the system 410 are suitable for the terminal equipment 130 on which the callee receives incoming calls in various embodiments of the invention. It should also be understood that a computer system such as system 410 of FIG. 3 is suitable in one or more of its forms such that the enterprise telecommunication application TAS 122 referred to herein includes system 410 in an embodiment of the invention. The system 410 includes a processor 415, a volatile memory 420, e.g., RAM, a keyboard 425, a pointing device 430, e.g., a mouse, a nonvolatile memory 435, e.g., ROM, hard disk, floppy disk, CD-ROM, and DVD, and a display device 405 having a display screen. Memory 420 and 435 are for storing program instructions, which are executable by processor 415, to implement various embodiments of a method in accordance with the present invention. Components included in system 410 are interconnected by bus 440. A communications device (not shown) may also be connected to bus 440 to enable information exchange between system 410 and other devices.

It should also be understood that the enterprise telecommunication application server referred to herein includes a computer system such as system 410 of FIG. 4. In various embodiments system 410 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

It should be appreciated that the invention is especially valuable for the case in which the callee is a mobile employee of the enterprise 106 (FIG. 1). That is, by initiating information retrieval earlier and selectively delaying call completion the invention enables a mobile employee using a device with voice, data and data display capability to more quickly receive information related to the call, or at least to receive the information more nearly in concurrence with TSPN 112 call completion. The additional time that the employee has to receive information before the call is completed allows the employee to be better informed and more responsive to the caller. If the call is completed before the information is delivered, this is still of value since the information will be delivered sooner in the call than if the information retrieval was initiated after the call was completed.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for phone call routing in a telephone service provider network in interaction with information processing in an enterprise network, the method comprising the steps of:
   a) receiving a call by a telephone service provider network ("TSPN") from a caller, wherein the call is directed to a callee associated with an enterprise;
   b) processing the call by the TSPN;
   c) sending a call notification to a telecommunication application server ("TAS") of the enterprise, wherein the TAS is not within the TSPN;
   d) delaying the TSPN's processing of the call, wherein c) and d) are performed before the call is completed; and
   e) resuming the processing of the call in response to a notification from the TAS.

2. The method of claim 1, wherein the delaying of the TSPN's processing of the call is responsive to a delay notification from the TAS.

3. The method of claim 2, wherein the resuming in step e) is responsive to a certain delay, the certain delay being specified in the delay notification.

4. The method of claim 1, wherein the notification in step e) is a resume notification and the processing is resumed immediately upon receiving the resume notification.

5. The method of claim 1 comprising the step of:
   completing the call by the TSPN responsive to a signal indicating that a unit of terminal equipment for the enterprise has accepted the call.

6. A method for information processing in an enterprise network phone in interaction with phone call routing in a telephone service provider network, the method comprising the steps of:
   a) receiving, from a public switched telephone network ("TSPN") by a telecommunication application server ("TAS") not within the TSPN, a call notification, wherein the call is directed to a callee associated with an enterprise, and wherein the TSPN is operable to delay processing of the call before completing the call in order to permit an enterprise application of the TAS to begin processing for the call;
   b) processing the call by an enterprise application of the TAS responsive to the call notification; and
   c) sending the TSPN a notification indicating for the TSPN to resume processing of the call.

7. The method of claim 6, wherein the call notification includes first information and the enterprise application processing of the method comprises the steps of:
   searching, responsive to receiving the first notification, for second information associated with the first information; and
   forwarding the second information for delivery to the callee.

8. The method of claim 7, wherein the second information is forwarded before the TSPN completes the call.

9. The method of claim 7, wherein the notification of step c) comprises:
   a resume notification sent to the TSPN after a predetermined delay, so that the TSPN may resume processing immediately upon receiving the resume notification.

10. The method of claim 6, comprising the step of:
    signaling the TSPN to complete the call, wherein the signaling is responsive to accepting the call by a unit of terminal equipment for the enterprise.

11. The method of claim 6, wherein the notification of step c) comprises:
    a delay notification indicating for the TSPN to wait a specified time before resuming processing of the call.

12. A computer program product for phone call routing in a telephone service provider network in interaction with information processing in an enterprise network, the computer program product comprising:
    a) instructions for receiving a call by a telephone service provider network ("TSPN") from a caller, wherein the call is directed to a callee associated with an enterprise;
    b) instructions for processing the call by the TSPN;
    c) instructions for sending a call notification to a telecommunication application server ("TAS") of the enterprise, wherein the TAS is not within the TSPN;
    d) instructions for delaying the TSPN's processing of the call, wherein instructions for c) and d) are for sending the call notification and delaying the processing before the call is completed; and
    e) instructions for resuming the processing of the call in response to a notification from the TAS.

13. The computer program product of claim 12, wherein the delaying of the TSPN's processing of the call is responsive to a delay notification from the TAS.

14. The computer program product of claim 13, wherein the resuming in instructions e) is responsive to a certain delay, the certain delay being specified in the delay notification.

15. The computer program product of claim 12, wherein the notification for instructions e) is a resume notification and the processing is resumed immediately upon receiving the resume notification.

16. The computer program product of claim 12, comprising:
    instructions for completing the call by the TSPN responsive to a signal indicating that a unit of terminal equipment for the enterprise has accepted the call.

17. A computer program product for information processing in an enterprise network phone in interaction with phone call routing in a telephone service provider network, the computer program product comprising:
    a) instructions for receiving, from a public switched telephone network ("TSPN") by a telecommunication application server ("TAS") not within the TSPN, a call notification, wherein the call is directed to a callee associated with an enterprise, and wherein the TSPN is operable to delay processing of the call before completing the call in order to permit an enterprise application of the TAS to begin processing for the call;

b) instructions for processing the call by an enterprise application of the TAS responsive to the call notification; and c) instructions for sending the TSPN a notification indicating for the TSPN to resume processing of the call.

18. The computer program product of claim 17, wherein the call notification includes first information and the instructions for processing of the call by an enterprise application comprise:

instructions for searching, responsive to receiving the first notification, for second information associated with the first information; and instructions for forwarding the second information for delivery to the callee.

19. The computer program of claim 18, wherein the second information is forwarded before the TSPN completes the call.

20. The computer program of claim 18, wherein the notification of instructions c) comprises:

a resume notification sent to the TSPN after a predetermined delay, so that the TSPN may resume processing immediately upon receiving the resume notification.

21. The computer program of claim 17, comprising:

instructions for signaling the TSPN to complete the call, wherein the signaling is responsive to accepting the call by a unit of terminal equipment for the enterprise.

22. The computer program of claim 18, wherein the notification of instructions c) comprises:

a delay notification indicating for the TSPN to wait a specified time before resuming processing of the call.

23. An apparatus comprising:

a processor; and a memory storing instructions operable with the processor for phone call routing in a telephone service provider network in interaction with information processing in an enterprise network, the instructions being executed for:

a) receiving a call by a telephone service provider network ("TSPN") from a caller, wherein the call is directed to a callee associated with an enterprise;

b) processing the call by the TSPN;

c) sending a call notification to a telecommunication application server ("TAS") of the enterprise, wherein the TAS is not within the TSPN;

d) delaying the TSPN's processing of the call, wherein c) and d) are performed before the call is completed; and e) resuming the processing of the call in response to a notification from the TAS.

24. The apparatus of claim 23, wherein the delaying of the TSPN's processing of the call is responsive to a delay notification from the TAS.

25. The apparatus of claim 24, wherein the resuming in e) is responsive to a certain delay, the certain delay being specified in the delay notification.

26. The apparatus of claim 23, wherein the notification in e) is a resume notification and the processing is resumed immediately upon receiving the resume notification.

27. The apparatus of claim 23, wherein the stored instructions are executed for:

completing the call by the TSPN responsive to a signal indicating that a unit of terminal equipment for the enterprise has accepted the call.

28. A apparatus comprising:

a processor; and a memory storing instructions operable with the processor for processing in an enterprise network in interaction with a telephone service provider network, the instructions being executed for:

a) receiving, from a public switched telephone network ("TSPN") by a telecommunication application server ("TAS") not within the TSPN, a call notification, wherein the call is directed to a callee associated with an enterprise, and wherein the TSPN is operable to delay processing of the call before completing the call in order to permit an enterprise application of the TAS to begin processing for the call;

b) processing the call by an enterprise application of the TAS responsive to the call notification; and c) sending the TSPN a notification indicating for the TSPN to resume processing of the call.

29. The apparatus of claim 28, wherein the call notification includes first information and the stored instructions are executed for:

searching by the enterprise application, responsive to receiving the first notification, for second information associated with the first information; and forwarding the second information by the enterprise application for delivery to the callee.

30. The apparatus of claim 29, wherein the second information is forwarded before the TSPN completes the call.

31. The apparatus of claim 29, wherein the notification of c) comprises:

a resume notification sent to the TSPN after a predetermined delay, so that the TSPN may resume processing immediately upon receiving the resume notification.

32. The apparatus of claim 28, wherein the stored instructions are executed for:

signaling the TSPN to complete the call, wherein the signaling is responsive to accepting the call by a unit of terminal equipment for the enterprise.

33. The apparatus of claim 28, wherein the notification of c) comprises:

a delay notification indicating for the TSPN to wait a specified time before resuming processing of the call.

* * * * *